United States Patent [19]

Krause et al.

[11] 4,179,347
[45] Dec. 18, 1979

[54] SYSTEM FOR ELECTROCATALYTIC TREATMENT OF WASTE WATER STREAMS

[75] Inventors: William A. Krause, Houston, Tex.; Evan P. Shea, Kansas City, Mo.

[73] Assignee: Omnipure, Inc., Houston, Tex.

[21] Appl. No.: 882,264

[22] Filed: Feb. 28, 1978

[51] Int. Cl.² .............................................. C02B 1/82
[52] U.S. Cl. ................................... 204/149; 204/152; 204/275; 210/19; 210/44; 210/62; 210/64; 210/221 M; 210/96.1
[58] Field of Search ............... 210/19, 44, 73 S, 62, 210/63 R, 64, 96 R, 195 R, 199, 202, 203, 243, 259, 294, 221 M, 221 P, 322, 388, 13; 204/149, 152, 275

[56] References Cited

U.S. PATENT DOCUMENTS

| | | | |
|---|---|---|---|
| 3,015,396 | 1/1962 | Quast | 210/221 P |
| 3,015,621 | 1/1962 | Quast | 210/221 P |
| 3,340,175 | 9/1967 | Mehl | 204/149 |
| 3,463,727 | 8/1969 | Fahey | 210/19 |
| 3,480,529 | 11/1969 | Waltrip | 204/152 |
| 3,617,539 | 11/1971 | Grutsch | 210/221 P |
| 3,664,951 | 5/1972 | Armstrong | 210/62 |
| 3,799,346 | 3/1974 | Freese | 210/221 P |
| 3,819,504 | 6/1974 | Bennett | 204/149 |
| 3,856,642 | 12/1974 | Lieb | 210/62 |
| 3,925,176 | 12/1975 | Okert | 204/152 |
| 3,943,044 | 3/1976 | Fenn | 204/149 |
| 3,945,918 | 3/1976 | Kirk | 210/44 |
| 3,975,247 | 8/1976 | Strasler | 210/62 |
| 4,009,104 | 2/1977 | Behrendt | 204/149 |
| 4,085,028 | 4/1978 | McCallum | 204/149 |

FOREIGN PATENT DOCUMENTS

| | | | |
|---|---|---|---|
| 2529647 | 1/1977 | Fed. Rep. of Germany | 210/62 |
| 556800 | 7/1973 | Switzerland | 210/44 |

Primary Examiner—Charles N. Hart
Assistant Examiner—Ernest G. Therkorn
Attorney, Agent, or Firm—Seed, Berry, Vernon & Baynham

[57] ABSTRACT

A continuous system for disinfecting waste water streams, such as sewage and streams containing organic matter and removing suspended solids therefrom is disclosed. A waste water stream is passed into an electrolytic cell open to the atmosphere and between a series of electrically charged parallel electrode plates. A controlled amount of electrolyte such as sodium chloride is added to the waste water stream before it passes through the electrolytic cell. During passage between the electrode plates a foam is generated which entrains suspended selected nutrient solids contained in the waste water stream, the foam removed by skimming and/or suction means. The treated water discharged from the electrolytic cell is filtered to remove additional non-nutrient suspended solids not entrained with the foam. A portion of the treated water from the electrolytic cell is recycled and reinjected into the influent stream. Control means are included to control residual chlorine in the effluent discharged from the electrolytic cell while maintaining high dissolved oxygen in the effluent.

8 Claims, 3 Drawing Figures 4,179,347

SYSTEM FOR ELECTROCATALYTIC TREATMENT OF WASTE WATER STREAMS

BACKGROUND OF THE INVENTION

1. Field of the Invention

This invention is directed to a system for the electrocatalytic treatment of waste waters containing suspended organic solids and bacteria.

2. Description of the Prior Art

There is an increasing need for an economical treatment system for waste water which is relatively maintenance free and which can be operated unattended. Electrolytic treatment of sewage-water mixtures to both disinfect the sewage and remove a portion of the suspended solids therefrom is known; however, no such means have proved entirely satisfactory. Reference is made, for example, to the following United States patents disclosing electrolytic treatment of sewage-water mixtures: U.S. Pat. Nos. 3,616,355; 3,756,933; 3,764,500; 3,766,033; 3,856,642; 3,925,176; 3,939,499; 3,943,044; 3,975,247; 3,975,256; 4,009,104; and 4,045,314.

SUMMARY OF THE INVENTION

It is a primary object of this invention to provide a system for the rapid and efficient treatment of waste water streams by electrocatalytically treating waste water as well as removing suspended solids therefrom.

It is a further object of this invention to provide a system for electrocatalytically treating waste water streams wherein selected nutrient solids are removed during passage through the electrolytic cell and residual suspended non-nutrient solids contained in the treated waste water stream discharged from the electrolytic cell are removed by mechanical filtration.

It is a further object of this invention to provide a system for the electrocatalytic treatment of waste water streams wherein a portion of the treated waste water stream discharged from the electrolytic cell is recycled and reinjected into the untreated incoming stream as a means of aiding in the control of residual chlorine, pretreating the incoming waste water and controlling the odor thereof.

It is a further object of this invention to provide a system for electrocatalytically treating waste water streams utilizing control means to control and monitor on a continuous basis the conductivity of the stream and the amount of electrolyte added to the influent stream.

It is a further object of this invention to provide a system for the treatment of waste water streams by electrolytic means wherein foam generated during passage of the stream through an electrolytic cell open to the atmosphere and containing nutrients and entrained solids is removed by skimming and/or suction.

It is a further object of this invention to provide a system for the electrocatalytic treatment of waste water streams which exceeds the minimum requirements for secondary treatment established by the Environmental Protection Agency.

It is a further object of this invention to provide a process for the electrocatalytic treatment of waste water streams which (1) reduces the problem of sludge disposal, (2) reduces odor problems generally associated with conventional waste water treatment plants, (3) enables water re-use, (4) can be built at lower capital costs and at considerably reduced size over conventional waste water treatment plants having comparable capacity and (5) can be operated unattended in the sense that continuous operator attendance is not required.

These and other objects are accomplished by a system wherein an incoming waste water stream having suspended solids therein is naturally aerated by flow over a wier and then passed into an electrolytic cell between a series of spaced parallel electrodes. An electric voltage is applied across the electrode plates in the electrolytic cell to generate chlorine, ozone and other gases which form a foam containing dissolved nutrients and nutrient solids floating on the surface of the liquid in the electrolytic cell. The foam containing the entrained solids are removed from the surface of the liquid in the electrolytic cell by skimming and/or suction. The residual, non-nutrient suspended solids remaining in the treated water discharged from the electrolytic cell are removed by passage through a filter. A portion of the treated stream discharged from the electrocatalytic cell is recycled and reinjected into the untreated incoming waste water stream. The incoming stream is directed through the electrolytic cell by use of suitable baffle plates to insure an even flow between the spaced electrode plates. An electrolyte such as sodium chloride is added to the untreated waste water stream before it enters the electrocatalytic cell in an amount sufficient to establish a conductivity of from 4,000 to 150,000 micromhos and to establish a predetermined residual chlorine content in the effluent discharged from the cell. A portion of the effluent discharged from the cell is recycled to maintain the conductivity of the incoming waste water stream entering the cell essentially constant without increasing the residual chlorine content of the effluent discharged from the cell.

DETAILED DESCRIPTION OF PREFERRED EMBODIMENTS

Figure 1:
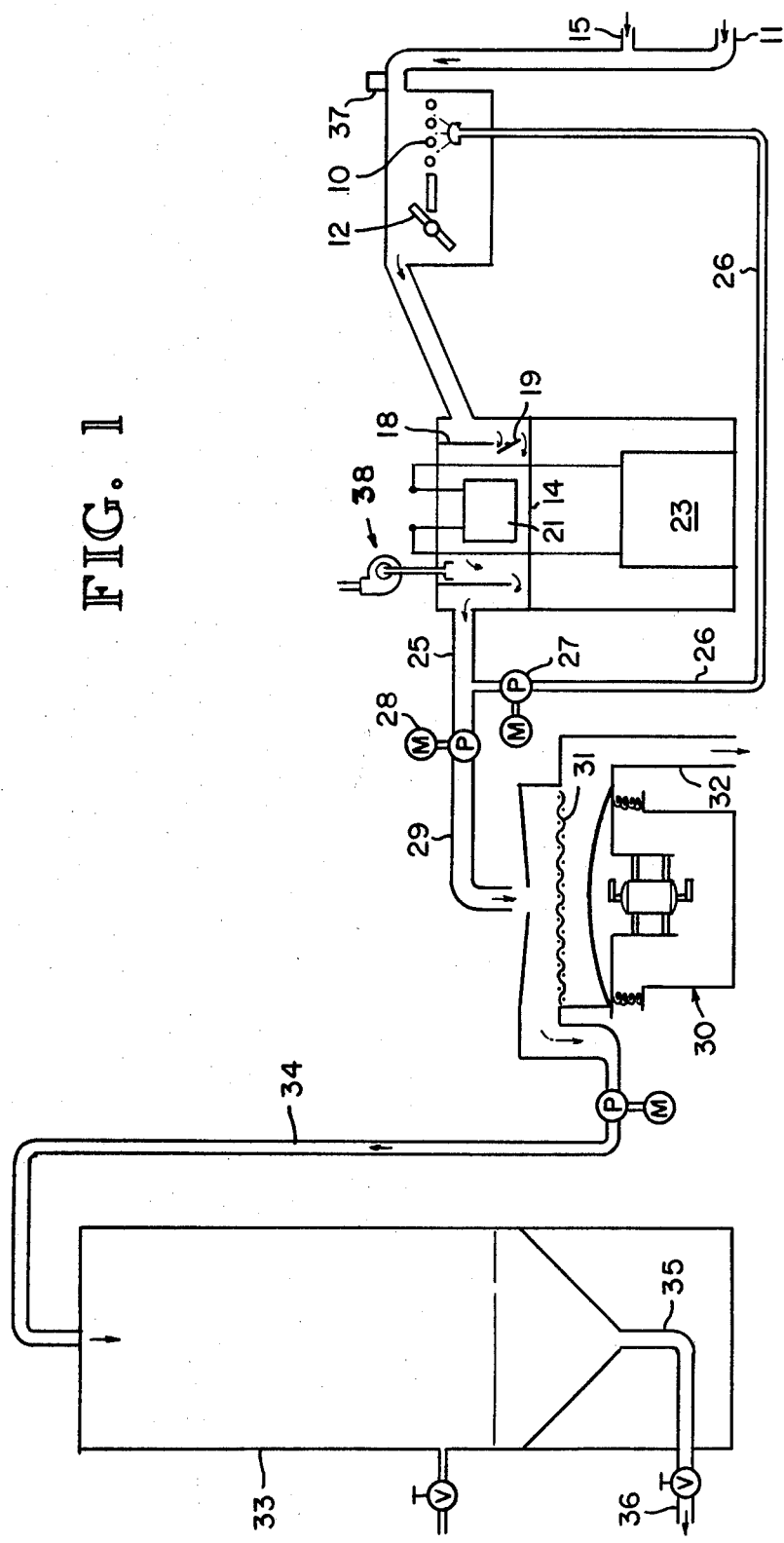
FIG. 1 is an overall schematic view of the system for electrocatalytic treatment of waste water streams.
Figure 2:
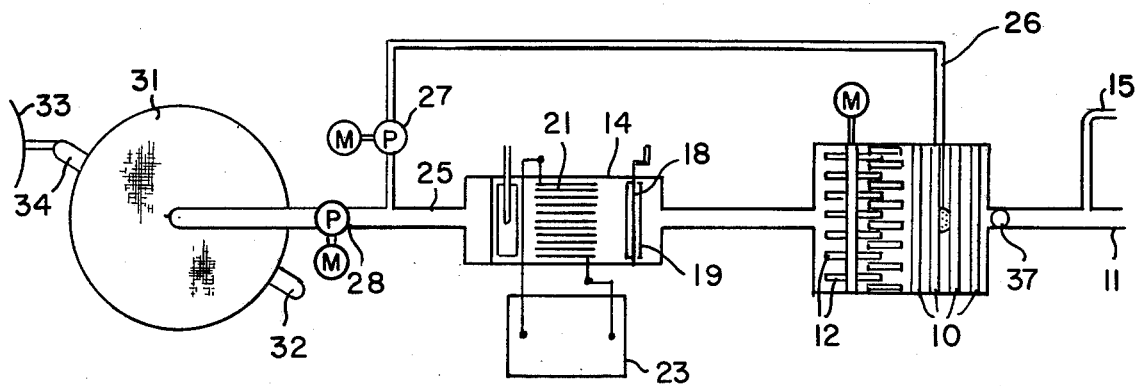
FIG. 2 is a top view of the system of FIG. 1.

Referring to FIG. 1, the overall waste water treatment system is shown. A waste water stream is directed through a bar grate 10 or other equivalent filter means for removing solids larger than a predetermined size. The stream may then be passed through a conventional mascerator 12 to break up the larger solids. The waste water stream then passes into the electrolytic tank over a wier 13 which aerates the stream. The waste water stream may be fed to the electrolytic tank by gravity flow or pumped.

Prior to passage of the waste water stream into the electrolytic tank 14 an electrolyte is added thereto. The electrolyte may be sodium chloride, sea water, or other suitable electrolyte. Generally the electrolyte is metered as an aqueous stream through conduit 15 into the incoming waste water stream through conduit 11. The amount of electrolyte injected into the untreated stream is controlled, relative to the amount of effluent recycled and the desired effluent characteristics, as will be explained.

Figure 3:
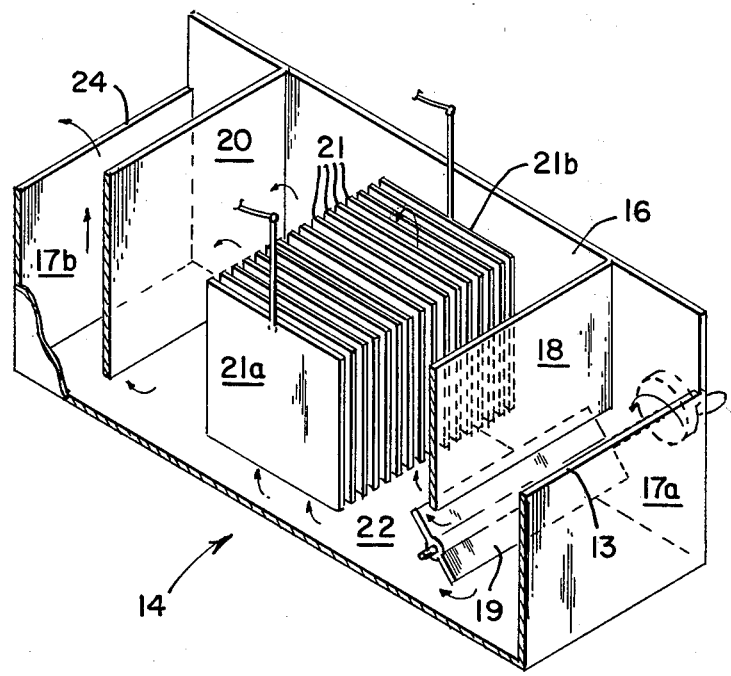
FIG. 3 is an isometric view of the electrolytic tank illustrating positioning of the electrode plates therein and the particular baffling arrangement for insuring an even flow through the tank.

The electrolytic tank 14, open to the atmosphere, is shown in isometric view in FIG. 3. The tank illustrated has parallel side walls 16, end walls 17, and bottom wall 22. The end walls 17 serve as wiers to control the level of liquid in the electrolytic tank and the height of walls 17a and 17b is such that the liquid level in the electrolytic tank is even with or just below the electrode plates positioned therein. The side walls 16 are substantially higher than the end walls 17. A fixed baffle plate 18 positioned at the infeed end of the electrolytic tank extends downwardly into the electrolytic tank below the upper edge of end walls 17. A fixed baffle plate 19, positioned below fixed baffle plate 18, is mounted at an angle with respect to baffle 18 on a shaft extending between and connected to the two respective parallel walls 16 of the electrolytic tank. A fixed baffle plate 20 is positioned adjacent the discharge end of the electrolytic tank as illustrated. This baffle plate extends downwardly from the upper edge of the electrolytic tank to a point beneath the liquid level. The baffle 20 serves to calm liquid flow through the tank and acts as a barrier for generated foam floating on the surface of the liquid in the tank. The baffles 18 and 19 even out the incoming flow vertically and horizontally and cause the incoming waste water stream to circulate generally upwardly through and between a series of spaced, parallel electrode plates 21 mounted between the baffle plates 18 and 20. Each of the electrode plates, both anode and cathode, are dimensionally stable electrodes of a suitable electrically conductive substrate metal with a surface coating thereon of a solid solution of a precious metal or metal oxide or mixture of precious metals or metal oxides. Electrodes of this type and their manufacture are described in British Pat. No. 1,195,871 and U.S. Pat. No. 3,624,873, for example. In the embodiments shown in FIG. 3 the electrodes are spaced about $\frac{1}{4}$ inch apart across the width of the electrolytic tank 14. Only the end electrode plates 21a and 21b are shown connected to a source of D.C. current; however, more than the end plates may be connected to a source of D.C. current if desired. A charge of from 1 to 1000 volts may be delivered to the electrode plates from a suitable rectifier 23. A practical operating range of from 20 to 100 volts is preferred. Adequate spacing of the electrode plates in the tank for maintaining the waste water stream being treated in close proximity to the nascent oxygen and chlorine generated at the surface of the electrodes is important. The preferred spacing is about $\frac{1}{4}$ of an inch, this spacing allowing adequate liquid flow through and between each of the electrodes; however, spacing of 3/32" or greater than $\frac{1}{4}$" may be employed. At periodic intervals it may be necessary to clean the electrode plates. This may be done by reversing the direct current applied to the electrode plates.

The upper edge of walls 17a and 17b act as wiers. As the waste water stream passes over the upper edge of weir 13, it is partially aerated. The solution strikes baffle plate 18 and is directed downwardly toward the bottom 22 of the electrolytic tank. A portion of the incoming stream directed downwardly strikes the baffle plate 19 and is deflected at the angle of the plate towards the electrode plates positioned in the electrolytic tank. The remainder of the liquid strikes the bottom of the tank 22 and is deflected along the bottom of the tank and flows generally vertically up through the electrode plates. With the arrangement shown, the waste water stream is stabilized in both the horizontal and vertical planes before passing through the electrode plates. The residence time of the waste water in the tank ranges from about 2 seconds to 60 seconds.

As has been mentioned, the electrolytic tank is operated open to the atmosphere contrary to units described by the prior art which are closed to prevent noxious gases generated in the electrolytic cell such as chlorine, from being disseminated to the atmosphere. It appears in the unit shown in FIG. 3, when operated as described herein, that the multitude of bubbles generated are, in the main, formed by oxygen and hydrogen released during electrolysis of water. Chlorine gas, also generated, is not released to the atmosphere. The reason for this appears to be due, in part, to the relatively large surface area of the electrode plates between which the stream passes and the internal recycle of the stream caused by the swirling motion through the plates. This allows the gases which are generated to be consumed by reaction and/or absorption before they rise to the surface of the waste water stream being treated in the tank.

The waste water, after passage through the electrode plates in the manner just described, flows under baffle 20 and out of the electrolytic tank over the upper edge 24 of end wall 17b into line 25 where it may be pumped by pump or allowed to flow by gravity to a filter unit such as a moving screen separator 30. The height of the upper edge 24 of end wall 17b controls the height of the liquid level in the electrolytic tank. The treated water entering line 25 contains residual chlorine, dissolved oxygen, sodium hypochlorite and other disinfecting and treating chemicals.

In order to make effective use of chlorine and other chemicals contained in the treated solution and to control the residual chlorine level in the effluent a portion of the treated effluent from the electrolytic tank is withdrawn through line 26 and pumped by pump 27 for reinjection into the incoming waste water stream at a point prior to introduction of the incoming stream into the electrolytic tank. The recycle stream may be sprayed against the bar grate 10 or filter to prevent blinding of the filter by solids in the incoming stream. This recycle stream, containing residual oxygen, chlorine, sodium hypochlorite and other treating chemicals acts to disinfect and begin treatment of the incoming waste water prior to its entering the electrolytic tank. Additionally, recycle of a portion of the treated effluent from the electrolytic tank cuts down on the amount of sodium chloride or other electrolyte which is added to the incoming stream to maintain the conductivity level of the stream essentially constant without an increase in the residual chlorine content of the effluent.

The treated effluent discharged from tank 14 is pumped by pump 28 or allowed to flow by gravity through line 29 into a filter unit such as a moving screen separator 30 which removes residual non-nutrient suspended solids not removed during passage through the electrolytic tank. The solids retained on the screen 31 may be disposed of as highly disinfected sludge fraction by incineration, land fill or they may be reclaimed as bleached fibers. The disinfected liquid discharged from the screen separator 30 through line 32 is essentially free of suspended solids and is suitable for discharge. The effluent meets and exceeds the minimum requirements for secondary discharge of water to streams in terms of its suspended solids content, biological oxygen demand, chemical oxygen demand, and a pH.

The solids fraction removed from the screen 31 of the filter unit 30 may, if desired, be pumped into a clarifier vessel 33 through line 34 where it is allowed to stand until the solids settle into the bottom of the clarifier vessel if further concentration of the solids fraction is desired. Periodically the solids fraction is withdrawn through line 35 and 36 to a suitable sludge disposal area.

The electrolytic tank is open to the atmosphere. No toxic gases, such as chlorine, are released to the atmosphere. Hydrogen and oxygen, produced by electrolysis of water, are retained in the foam and removed by skimming and/or suction means.

The salt solution, generally a solution of sodium chloride is injected into line 11 through line 15 in an amount sufficient to achieve a concentration of from 0.1 to 5.0% by weight salt, based on the weight of the waste water stream preferably 0.3 to 1.0% by weight. The influent waste water stream may be subjected to masceration as described to reduce the size of the solids in the incoming stream. The waste water stream flowing through the spaced electrode plates in the electrolytic tank is electrolyzed. Chemical agents such as sodium hypochlorite are generated in situ by the reaction of a mixture of chlorine formed at each anode and sodium hydroxide formed at each cathode. These chemicals permeate the waste water stream and disinfect the liquid portion thereof as well as react with a portion of the suspended solids to reduce them by direct oxidation. A multitude of micro gas bubbles are formed at each anode and rise rapidly throughout the waste water stream causing suspended solids, particularly the nutrient organic suspended solids in the stream, to be entrained and float to the surface of the mixture. The solids are entrained on the surface of the liquid in the electrolytic tank in the form of a foam which is removed intermittently or continuously by skimming and/or suction means 38. The entrained solids removed along with the foam (1) may be discarded as a sludge material, or (2) may be conveyed to clarifier 33 to be blended with the suspended solids removed by mechanical filtration by moving screen filter 30 and added to irrigation water as a soil nutrient or recovered for sale provided the salt content of the solids is not too high.

The effluent discharged from the filter unit 30 through conduit 32 must meet minimum standards for discharge into water bodies. One of those standards is a so-called "residual chlorine" standard. It is important to operate the system such that the effluent discharged does not contain an excess of residual chlorine. A conductivity meter 37 is used to measure the conductivity of the influent waste water stream after injection of the electrolyte into the stream. The conductivity meter is operatively connected to a proportioning valve (not shown) which adjusts the amount of electrolyte injected into the influent mixture through line 15 such that the residual chlorine content in the effluent discharged through line 32 does not exceed a predetermined level. Initially, a sufficient amount of a water soluble chloride salt is added to the influent waste water stream to establish a predetermined conductivity, for example, from 4,000 to 150,000 micromhos. Thereafter, recycle of a portion of the treated effluent and control of the amount of chloride salt added allows control of the residual chlorine content of the treated effluent while maintaining the conductivity of the waste water in the electrolytic cell essentially constant. The effluent discharged may be used for irrigation purposes provided the salt content of the effluent is not excessive.

The filter unit 30 is preferably of the type manufactured and sold by Sweco, Inc., of Los Angeles, Calif. and may be a vibrating screen separator or rotating screen separator.

The reactions at the plurality of anodes formed when the electrode plates are charged with direct current include (1) production of chlorine and sodium hypochlorite, (2) direct oxidation at the anode surface of organic materials, bacteria and certain solids (nutrient solids), and (3) production of oxygen and ozone. As a result of these reactions the liquid discharged from the electrolytic tank generally contains dissolved oxygen, sodium hypochlorite and chlorine. Organic compounds are oxidized and converted to carbon dioxide and water. The nutrient suspended solids are removed by electroflotation of the solids as a foam in the electrolytic tank as previously described. This foam is removed continuously or intermittently by skimming and/or suction means 38 as previously described.

An electrocatalytic unit as illustrated in FIG. 1 was designed to process 100,000 gallons of sewage a day. The unit has treated in excess of its designed capacity. The major advantages of the unit include (1) the low residence time required for effective removal of suspended solids and killing of pathogenic organisms contained in the influent sewage-water mixture, (2) reduced odor, (3) reduced size and cost compared to a conventional treatment plant of comparable capacity and (4) reduction in the amount of sludge to be disposed. The electrolytic tank used measured 3 feet by 1½ feet by 1½ feet and contained 50 electrode plates, each 12 inches square, spaced ¼ inch apart. Direct current of about 300 volts was delivered to the respective electrodes. The residence time of liquid flowed through the electrolytic tank was estimated to be about 6 seconds. This has been found effective to kill microorganisms contained in the incoming sewage-water mixture as well as remove nutrient suspended solids in the incoming stream except for a fibrous non-nutrient fraction which is removed by filtration through a vibrating screen separator.

We claim:

1. A process for the electrocatalytic treatment of waste water stream containing suspended solids and pathogenic organisms comprising:

adding a measured quantity of an electrolyte which, on being subjected an electrolyzing current, generates chlorine in situ, to an influent waste water stream, passing the waste water stream through and between a plurality of closely spaced, planar, electrocatalytically active electrode plates having exposed surfaces including a precious metal or precious metal oxide positioned in an electrolytic treatment vessel parallel to the flow of the waste water stream through the treatment vessel, maintaining the liquid level of the waste water stream in the electrolytic treatment vessel substantially constant relative to the plurality of electrode plates, delivering an electrolyzing quantity of electric current to the electrode plates to generate chlorine, oxygen and other disinfecting chemicals in situ and concurrently generate a multitude of gaseous bubbles which entrain and float nutrient-containing suspended solids in the waste water stream as a foam on the surface of the stream in the electrolytic treatment vessel, withdrawing the foam containing the entrained suspended solids from the surface of the stream in the electrolytic treatment vessel, discharging the treated waste water stream from the electrolytic treatment vessel into a filter for removal of fibrous residual suspended solids contained in the stream, and measuring the conductivity of the waste water stream entering the electrolytic treatment vessel and continuously controlling the amount of electrolyte added to the incoming waste water stream to maintain the conductivity of the stream being treated substantially constant, thereby controlling the amount of residual chlorine present in the treated waste water stream discharged from the electrolytic treatment vessel.

2. The process of claim 1 including aerating the waste water mixture prior to discharge of the stream into the electrolytic treatment vessel.

3. The process of claim 1 wherein the conductivity of the stream is maintained by controlling the amount of electrolyte added to the incoming stream and simultaneously controlling the amount of effluent recycled for injection into the incoming stream.

4. A system for the electrocatalytic treatment of waste water streams to yield a discharge effluent which is essentially free of suspended solids and pathogenic organisms comprising:

an electrolytic treatment vessel having an infeed end and a discharge end, a plurality of closely spaced, planar, electrocatalytically active electrode plates having exposed surfaces including a precious metal or precious metal oxide positioned in the electrolytic treatment vessel intermediate the infeed and discharge ends thereof and parallel to the flow of the waste water stream through the electrolytic treatment vessel, means to maintain the level of the waste water stream in the electrolytic treatment vessels substantially constant relative to the electrode plates, means to insure even flow of the waste water stream between and through the electrode plates positioned in the electrolytic treatment vessel, means for metering a measured quantity of an electrolyte into the waste water stream prior to entry of the stream into the electrolytic treatment vessel, means responsive to the measured conductivity for continuously adjusting the amount of electrolyte metered into the influent waste water stream to maintain the conductivity of the stream being treated substantially constant, power means delivering the charge of direct current to each of the end electrode plates, the electrical current charging the spaced electrode plates with an electrolyzing current for generation of chlorine, oxygen and other chemicals in situ and concurrent generation of a multitude of gaseous bubbles which entrain and float suspended nutrient solids in the waste water stream to the surface of the waste water stream in the electrolytic treatment vessel as a foam, mechanical filter means positioned at the discharge end of the electrolytic treatment vessel accepting the discharge stream from the electrolytic treatment vessel for removal of residual non-nutrient suspended solids from the stream, and skimming and suction means for withdrawing the foam containing the entrained suspended solids from the surface of the waste water stream.

5. The system of claim 4 including aeration means at the feed end of the electrolytic treatment vessel for pre-aerating the incoming waste water stream.

6. The system of claim 4 including means for recycling a portion of the effluent discharged from the electrolytic treatment vessel to the influent waste water stream to aid in maintaining the conductivity of the stream constant and minimizing the amount of electrolyte added to the influent waste water stream.

7. The system of claim 4 wherein the mechanical filter means is a vibrating or rotating filter screen.

8. The system of claim 4 wherein the means for insuring even flow of the waste water stream through the electrolytic treatment vessel includes a fixed baffle plate at the infeed end of the electrolytic treatment vessel positioned above the liquid level of the treatment vessel directing the incoming flow of waste water downwardly, a baffle plate at the lower end of the fixed plate positioned at an angle with respect to the fixed plate for redirecting a portion of the downwardly directed incoming flow laterally and parallel to the electrode plates, a fixed baffle plate near the discharge end of the electrolytic treatment vessel whose upper surface is above the liquid level in the electrolytic treatment vessel, and a wier at the discharge end of the electrolytic treatment vessel for maintaining the liquid level in the treatment vessel substantially constant.

* * * * *